(12) United States Patent
Forster

(10) Patent No.: US 10,490,045 B2
(45) Date of Patent: Nov. 26, 2019

(54) METHOD, SYSTEM, AND APPARATUS FOR AN INDICATOR DRIVEN BY AN RFID TAG FOR LOCALIZATION PURPOSES

(71) Applicant: Avery Dennison Corporation, Pasadena, CA (US)

(72) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 414 days.

(21) Appl. No.: 13/667,233

(22) Filed: Nov. 2, 2012

(65) Prior Publication Data

US 2013/0107042 A1    May 2, 2013

Related U.S. Application Data

(60) Provisional application No. 61/554,549, filed on Nov. 2, 2011.

(51) Int. Cl.
*G08B 13/24*    (2006.01)
*G06K 19/077*    (2006.01)
(Continued)

(52) U.S. Cl.
CPC ..... *G08B 13/2462* (2013.01); *G06K 7/10079* (2013.01); *G06K 19/07703* (2013.01); *G06K 19/07705* (2013.01); *G06K 19/07707* (2013.01); *G06K 19/07713* (2013.01); *G06K 19/07749* (2013.01); *G08B 13/246* (2013.01); *G08B 13/2417* (2013.01); *G08B 5/36* (2013.01)

(58) Field of Classification Search
USPC .......................................... 348/143
See application file for complete search history.

(56) References Cited

U.S. PATENT DOCUMENTS 6,329,920 B1 *  12/2001  Morrison ............. A01K 11/006
                                              235/472.02
6,577,238 B1 *   6/2003  Whitesmith .......... G01S 13/878
                                                340/10.1
(Continued)

FOREIGN PATENT DOCUMENTS

CN    101651784     2/2010
CN    101894287    11/2010
(Continued)

OTHER PUBLICATIONS

Capturing Images with Sparse Informational Pixels using Projected 3D Tags, L. Zhang, N. Subramaniam, R. Lin, S. K. Nayar, and R. Raskar, Proceedings of IEEE Virtual Reality Conference, DOI: 10.1109/VR.2008.4480744, Reno, NV, Mar. 2008. Publication Year: 2008 , pp. 11-18.*

(Continued)

*Primary Examiner* — Richard A Hansell, Jr.
(74) *Attorney, Agent, or Firm* — Avery Dennison Retail Information Services, LLC

(57) ABSTRACT

According to one exemplary embodiment a system, method and apparatus for an indicator driven by a RFID tag for localization purposes may be disclosed. An RFID tag may be disposed on an item. The RFID tag may have an indicator element. A RFID reader may be in communication with the RFID tag such that the indicator element can be activated in order to localize the item.

15 Claims, 7 Drawing Sheets

(51) Int. Cl.
*G06K 7/10* (2006.01)
*G08B 5/36* (2006.01)

(56) References Cited

U.S. PATENT DOCUMENTS

| | | | | |
|---|---|---|---|---|
| 7,538,681 | B1* | 5/2009 | Sharma | G06K 7/0008 235/375 |
| 7,741,967 | B2* | 6/2010 | Valeriano | G06K 17/00 340/539.11 |
| 7,920,063 | B2* | 4/2011 | Ulrich | G06Q 20/208 235/385 |
| 8,228,196 | B1* | 7/2012 | Thornton | G06Q 30/0268 235/378 |
| 2002/0185532 | A1 | 12/2002 | Berquist et al. | |
| 2004/0252030 | A1* | 12/2004 | Trimble | G08B 13/2417 340/8.1 |
| 2005/0110639 | A1 | 5/2005 | Puzio et al. | |
| 2006/0007000 | A1* | 1/2006 | Yap | G06K 7/10079 340/539.32 |
| 2006/0066453 | A1* | 3/2006 | Homanfar | A61B 6/14 340/686.2 |
| 2006/0261951 | A1 | 11/2006 | Koerner et al. | |
| 2007/0241907 | A1* | 10/2007 | Bauchot | G06K 19/07749 340/572.7 |
| 2007/0257799 | A1* | 11/2007 | Bauchot | G06K 19/07749 340/572.1 |
| 2008/0147529 | A1* | 6/2008 | Kreiner | G06Q 10/087 705/34 |
| 2008/0211671 | A1* | 9/2008 | Daily | G06Q 20/18 340/572.1 |
| 2009/0115580 | A1* | 5/2009 | Koerner | G01S 1/70 340/10.1 |
| 2009/0115581 | A1* | 5/2009 | Forster | G06K 19/0723 340/10.1 |
| 2009/0121843 | A1* | 5/2009 | Bauchot | G06K 7/0008 340/10.31 |
| 2009/0167495 | A1* | 7/2009 | Smith | G06K 19/07703 340/10.1 |
| 2010/0026465 | A1 | 2/2010 | Gravelle et al. | |
| 2010/0277283 | A1* | 11/2010 | Burkart | G06Q 10/00 340/10.3 |
| 2012/0056722 | A1* | 3/2012 | Kawaguchi | G06K 7/10009 340/10.1 |
| 2012/0224076 | A1* | 9/2012 | Niedermeyer | G06K 7/01 348/211.2 |
| 2014/0327520 | A1* | 11/2014 | Munjuluri | G06K 7/10366 340/8.1 |

FOREIGN PATENT DOCUMENTS

| | | |
|---|---|---|
| CN | 101001703 | 12/2010 |
| CN | 101976377 | 2/2011 |
| CN | 101416201 | 5/2012 |
| CN | 101951500 | 7/2012 |
| CN | 101821785 | 8/2013 |
| WO | 9859258 | 12/1998 |

OTHER PUBLICATIONS

Coon, Location-Aware RFID Mobile Device system for Museum Applications, Thesis, Dept. Computer Science, University of Colorado, Spring 2011.*
Lindsay J. et al. "RFID Locating Systems for Linking Valued Objects with Multimedia Files", Nov. 25, 2003, available online at http://www.jefflindsay.com/rfid2.shtml.*
Zhang et al. "Capturing Images with Sparse Informational Pixels using Projected 3D Tags", Proc. of IEEE Virtual Reality, Reno, NV, Mar. 2008.*
Kenneth, K.O. et al. "On-Chip Antennas in Silicon ICs and Their Application", IEEE Transactions on Electronic Devices, vol. 52, No. 7, Jul. 2005.*
Vargas A. and L. Vojtech, "Near Field on Chip RFID Antenna Design", from Radio Frequency Identification Fundamentals and Applications, Design Methods and Solutions, Book edited by Christina Turcu ISBN 978-953-7619-72-5, pp. 324, Feb. 2010.*
Lindsay J. et al. "RFID Locating Systems for Linking Valued Objects with Multimedia Files", Nov. 25, 2003, available online at http://www.iefflindsay.com/rfid2.shtml (Year: 2003).*
Vargas A. and Vojtech, "Near Field on Chip RFID Antenna Design", from Radio Frequency Identification Fundamentals and Applications, Design Methods and Solutions, Book edited by Christina Turcu ISBN978-953-7619-72-5, pp. 324, Feb. 2010 (Year: 2010).*
Kenneth, K.O. et al. "On-Chip Antennas in Silicon ICs and Their Application", IEEE Transactions on Electronic Devices, vol. 52, No. 7, Jul. 2005 (Year: 2005).*
Coon, Location-Aware RFID Mobile Device system for Museum Applications, Thesis, Dept. Computer Science, University of Colorado, Spring 2011 (Year: 2011).*
Zhang et al. "Capturing Images with Sparse Informational Pixels using Projected 3D Tags", Proc. of IEEE Virtual Reality, Reno, NV, Mar. 2008 (Year: 2008).*
Capturing Images with Sparse Informational Pixels using Projected 3D Tags, L. Zhang, N. Subramaniam, R. Lin, S. K. Nayar, and R. Raskar, Proceedings of IEEE Virtual Reality Conference, DOI: 10.1109/VR.2008.4480744, Reno, NV, Mar. 2008. Publication Year: 2008, pp. 11-18 (Year: 2008).*
International Search Report and Written Opinion dated Apr. 11, 2013 for International Application No. PCT/US2012/63191.
International Preliminary Report on Patentability dated May 6, 2014 for International Application No. PCT/US2012/63191.
Redemske, R.; Fletcher, R., "Design of UHF RFID Emulators with Applications to RFID Testing and Data Transport," Automatic Advanced Technologies, 2005. Fourth IEEE Workshop on, vol., No., pp. 193-198, Oct. 17-18, 2005, [retrieved Mar. 21, 2013] retrieved on line: URL: http://ieeexplore.ieee.org/xpl/login.jsp?tp=&arnumber=1544424&isnumber=32967.
Report of First Office Action and Search Report of Chinese Patent Application No. 201280065819.5 dated Aug. 1, 2015.

* cited by examiner

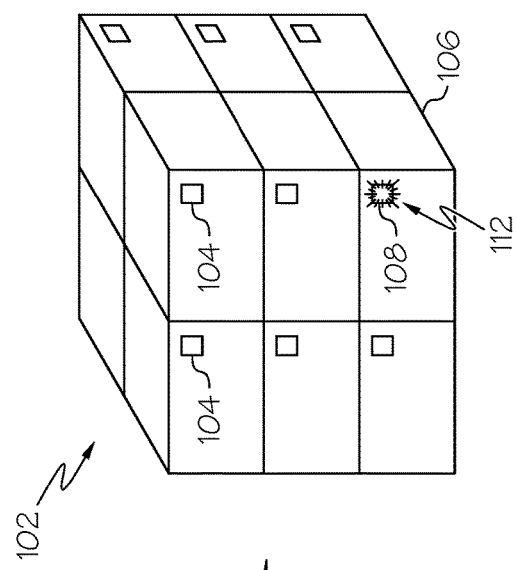
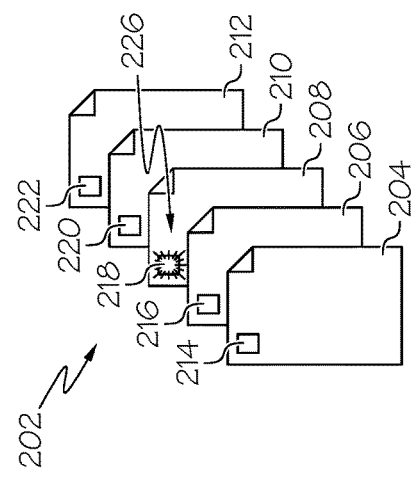
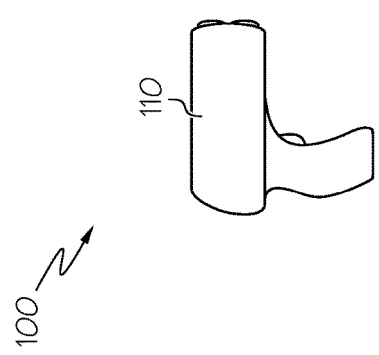
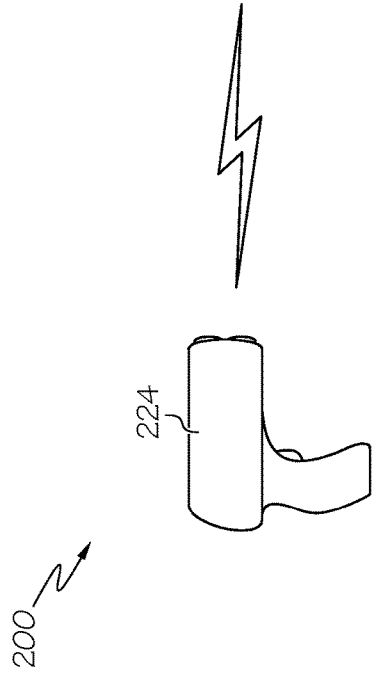
FIG. 1
FIG. 2

US 10,490,045 B2

METHOD, SYSTEM, AND APPARATUS FOR AN INDICATOR DRIVEN BY AN RFID TAG FOR LOCALIZATION PURPOSES

CROSS-REFERENCE TO RELATED APPLICATION

The present application claims the benefit of U.S. Provisional Application No. 61/554,549 filed Nov. 2, 2011, which is incorporated herein by reference in its entirety.

BACKGROUND OF THE INVENTION

The use of radio frequency identification (RFID) type devices for document and inventory tracking purposes has grown significantly in recent years. Typically, an item can be affixed with a specific RFID tag unique to the item. A RFID reader can then be used to read the RFID tag to determine if a particular item is amongst a larger group of items. For example, in a document tracking scenario, unique RFID tags may be affixed to each of a number of documents in a stack. A person looking for a particular document may use an RFID reader to communicate with that document's unique RFID tag. The RFID reader may then indicate if the document is present in the stack.

However, while RFID tags may be used to indicate the presence of a specific item amongst a number of items, the specific item must still be physically located. For example, even if an RFID reader detects the presence of a particular document amongst a stack of documents, a person must still take the time to sift through the stack of documents to find the particular document.

SUMMARY OF THE INVENTION

According to one exemplary embodiment a system for an indicator driven by a RFID tag for localization purposes may be disclosed. A RFID tag may be disposed on an item. The RFID tag may have an indicator element. A RFID reader may be in communication with the RFID tag such that the indicator element can be activated in order to localize the item.

According to one exemplary embodiment a method for an indicator driven by a RFID tag for localization purposes may be disclosed including the steps of associating a unique RFID tag with a specific item, transmitting a signal from a RFID reader to the RFID tag, activating an indicator on the RFID tag in response to the signal, and localizing the item by the indicator.

BRIEF DESCRIPTION OF THE DRAWINGS

Advantages of embodiments of the present invention will be apparent from the following detailed description of the exemplary embodiments. The following detailed description should be considered in conjunction with the accompanying figures in which:

FIG. 1 is an exemplary embodiment of a system for an indicator driven by an RFID tag for localization purposes;

FIG. 2 is another exemplary embodiment of a system for an indicator driven by an RFID tag for localization purposes;

DETAILED DESCRIPTION OF THE EMBODIMENTS

Figure 1A:
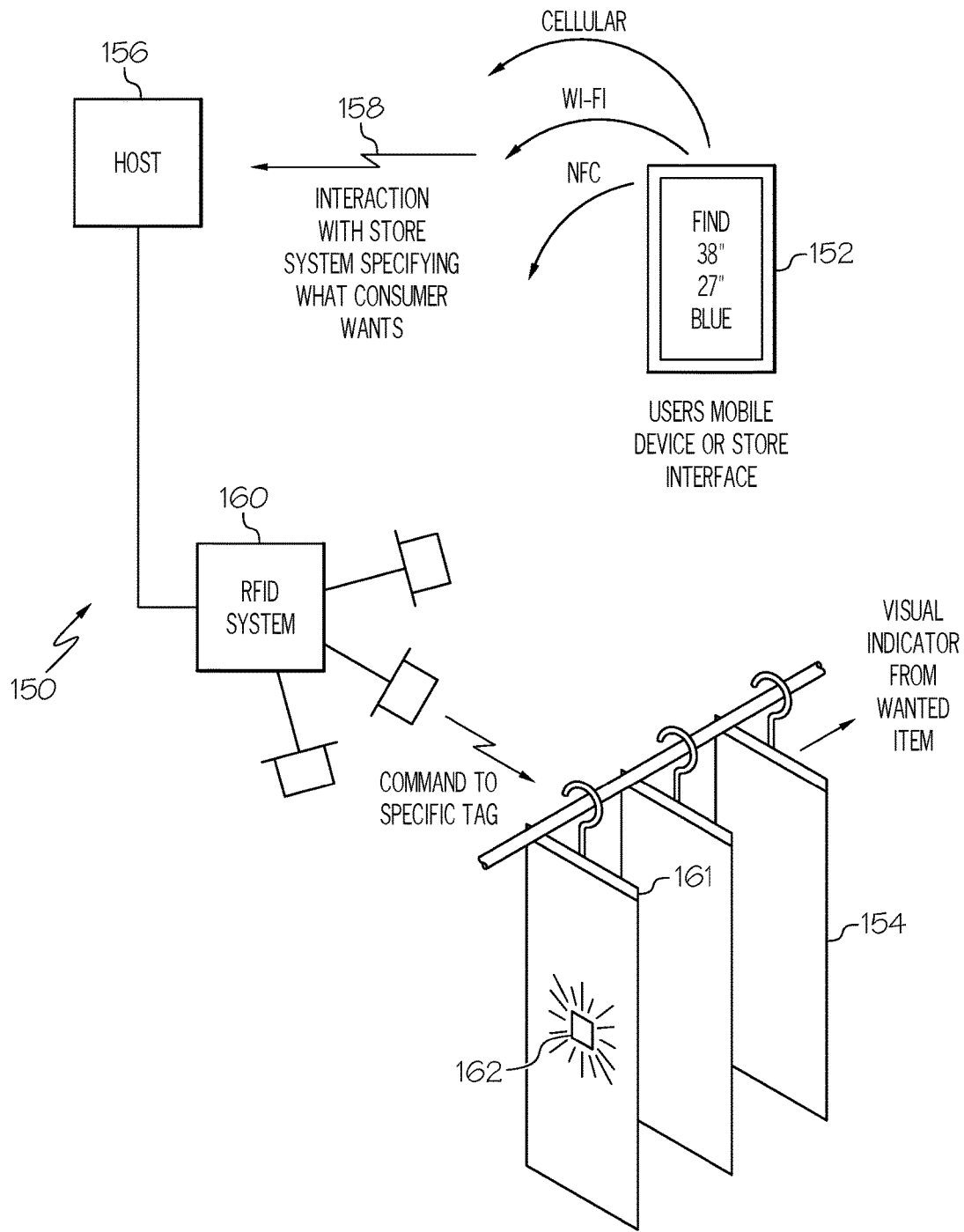
FIG. 1A is a further exemplary embodiment of a system for an indicator driven by a RFID tag.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Referring to FIG. 1, an exemplary embodiment of a system 100 for an indicator driven by an RFID tag for localization purposes may be disclosed. System 100 may include a plurality of items 102 located in proximity to one another. Items 102 may be, for example, packages, pallets, other product containers, inventory or the like. Each item 102 may have a RFID tag 104 affixed or attached thereto. RFID tags 104 may be affixed or attached to items 102 by any means known to a person of ordinary skill in the art, for example, by an adhesive. Each RFID tag 104 may be unique to the specific item 102 on which it is affixed or attached.

Exemplary RFID tags, which may include labels and inlays, are available from Avery Dennison Retail Information Services, Clinton, S.C.

System 100 may have a particular item 106 amongst plurality of items 102. Item 106 may have a RFID tag 108 affixed or attached thereto. RFID tag 108 may be unique to item 106 and associated only therewith. System 100 may have an RFID reader 110, which may be a handheld or portable reader, or any other type of reader, as desired. RFID reader 110 may be configured to communicate individually with any one of RFID tags 104 by means of a unique signal. RFID tags 104 may respond to a signal from RFID reader 110 with an indicator, for example, a visual indicator. The indicator may be triggered by a specific command or event during the normal reading or writing to the RFID tag according to a defined protocol or may be present when the RFID tag is receiving energy above a threshold, and will be modulated when the RFID tag communicates to the reader system, allowing a system combining RFID reader and indicator detector to correlate the two data streams and determine in an image or other representation of the space which RFID identity is associated with which optical emission. Visual indicator may be, for example, be a light emitting diode, electro-luminescent panel or other similar emissive visual indicator. Alternatively the visual indicator may be non emissive, such as a liquid crystal device, electrophoretic device or other structure, such as a LCD shutter combined with an optical retrorefelector, where the indication is in the form of a change in reflectivity. In other exemplary embodiments, other forms of indicators, for example an audio, vibrational, textural or emissive indicators operating outside the normal visible wavelengths of light may be used, such as infra-red or ultraviolet may be used.

In one exemplary embodiment, a user of system 100 may desire to locate item 106 amongst plurality of items 102. RFID reader 110 may then transmit a signal to RFID tag 108, which is known to be associated with item 106. Upon receiving a signal from RFID reader 110, RFID tag 108 may respond by activating a visual indicator 112. A user may then use the visual indicator 112 of RFID tag 108 to locate item 106 amongst plurality of items 102.

Reference is now directed to FIG. 1A which provides a further exemplary embodiment of what is depicted in FIG. 1. As illustrated in FIG. 1A, a consumer for example, shopping or searching for a garment of a particular size using the system 150. The consumer having a mobile device 152, such as a Smart Phone or tablet, identifies the item or items 154 of interest. In the present example, the items 154 of interest could be apparel items and the user may make a selection based on size, color but it could be any sort of consumer items. The user through the mobile device 152 identifies the item of interest 154 with the store or host system 156 and specifies what the consumer is interested in. The interaction 158 may occur via the Internet, local WIFI, very short range NFC or by any other suitable communication means. The host system 156 then use an RFID system 160 that is capable of reading/writing to RFID tags 162 in a given area, such as a shelf or rack were the particular consumer items may be located, such as by a hanger 161 on a rack, to activate the visual or other indicator on the RFID tag 162 that is associated with the chosen item. While FIG. 1A shows the RFID System 160 displaced from the area where the items 154 are located, it should be understood that the RFID system 160 can be integrated with the shelving or racking on which the consumer items are located. Thus, through interaction between the host system 156 and the consumer's mobile device 152, the consumer is able to activate an indicator 162 on a consumer item and more quickly locate the item.

Referring to FIG. 2, another exemplary embodiment of a system 200 for an indicator driven by an RFID tag for localization purposes may be disclosed. System 200 may include a plurality of documents 202 made up of individual documents 204, 206, 208, 210 and 212 in proximity to one another. For example, documents 202 may be a stack of papers, files, folders or the like.

Each of the plurality of documents 202 may have an individual RFID tag affixed or attached thereto. As shown in FIG. 2, individual documents 204, 206, 208, 210 and 212 may have RFID tags, 214, 216, 218, 220 and 222, respectively. System 200 may have RFID reader 224 which may be a handheld or portable reader, or any other type of reader, as desired. RFID reader 224 may be configured to communicate individually with any one of RFID tags 214, 216, 218, 220 and 222 by means of a unique signal. RFID tags 214, 216, 218, 220 and 222 may respond to a signal from RFID reader 224 with an indicator, for example, a visual indicator.

In one exemplary embodiment, a user of system 200 may desire to locate document 208 amongst plurality of documents 202. RFID reader 224 may then transmit a signal to RFID tag 218, which is known to be associated with document 208. Upon receiving a signal from RFID reader 224, RFID tag 218 may respond by activating a visual indicator 226. A user may then use the visual indicator 226 of RFID tag 218 to locate item 208 amongst plurality of items 202.

Figure 2A:
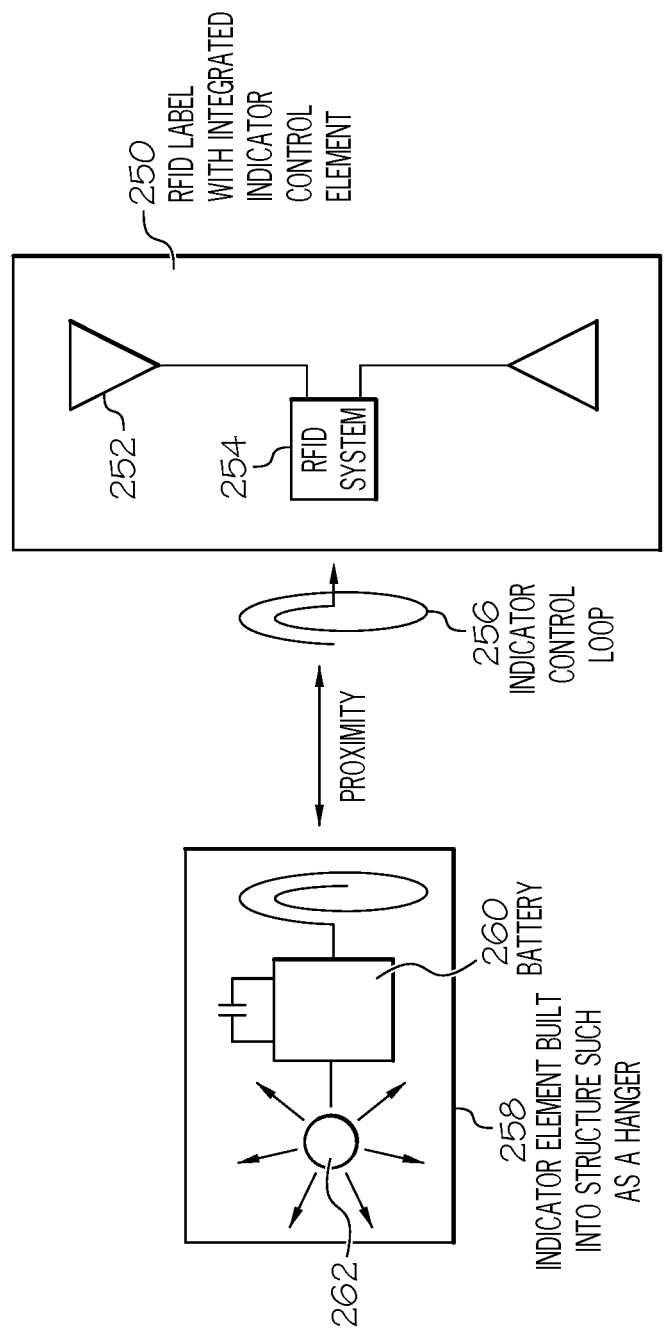
FIG. 2A is a further exemplary embodiment of a system for an indicator driven by an RFID tag.

Reference is now directed to FIG. 2A which shows a further exemplary embodiment of the system provided schematically in FIG. 2. FIG. 2A illustrates a RFID tag 250 having an antenna 252 and a chip 254. The RFID tag includes an indicator control loop 256. In this embodiment, rather than including the indicator directly on the RFID tag as in the previous embodiment, which may require a power source such as a battery thereby increasing the cost of each individual RFID tag, the RFID tag of the current embodiment includes an indicator control loop 256 or element. For example, the RFID tag 250 may have a coil 256 connected to a pair of I/O pins on an RFID chip 254. The state of the pins, for example the presented capacitance or having a short/open, is controllable via an RFID infrastructure such as shown by reference to numeral 160 in FIG. 1A. The indicator 258 is provided with a battery 260 to power the indicator light or other alerting device 262. The indicator is now built into a re-usable shop item such as a hanger 161 (see FIG. 1A). The hanger is then clamped or otherwise positioned close to the RFID tag 250 associated with the garment, such as by inserting the hanger into the garment. The state of the indicator control element 256 in the tag 250 controls the indicator 258 through the RFID host system 160. As the hanger is re-usable, the cost of the indicator 268 which includes a battery 260 and indicator light 262 is spread over multiple uses when the hanger is recycled after the garment has been purchased.

Figure 3:
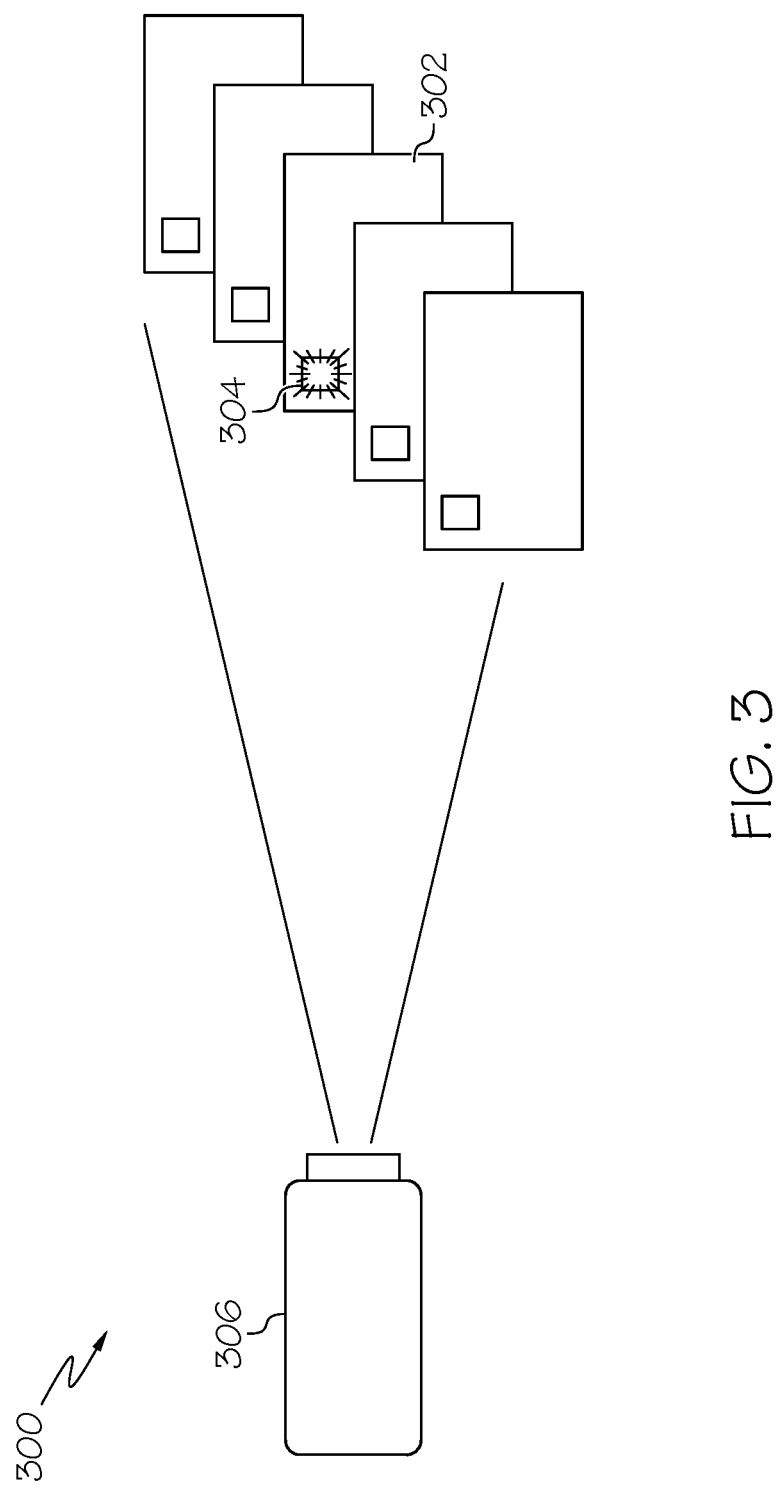
FIG. 3 is another exemplary embodiment of a system for an indicator driven by an RFID tag for localization purposes.

Referring to FIG. 3, another exemplary embodiment of a system 300 for an indicator driven by an RFID tag for localization purposes may be disclosed. System 300 may include an item 302 with an RFID tag 304 disposed thereon. Item 302 may be any type of item, for example, a security badge, ticket, sensitive document or the like. System 300 may have camera 306. Camera 306 may be, for example, a surveillance camera equipped with an infra-red filter.

In one exemplary embodiment, when item 302 is within range of camera 306, RFID tag 304 may be detectable. For example, RFID tag 304 may have an indicator, for example an infra-red indicator that can be detected by camera 306. RFID tag 304 may then be seen by camera 306 with very high sensitivity and discrimination against background light, as the electronic shutter on the camera system can be made to only accept light when RFID tag 304 is emitting. In this way, very low levels of infra-red light emitted by a tag can be detected, either by single detection or integration of multiple emmisions. To improve detection and rejection of interfering sources, the time between activations of RFID tag 304's indicator may be changed according to a pseudo random pattern, so that a regular interference source, (such as an artificial light source), cannot stay correlated in the time domain. In another exemplary embodiment camera 306 may record information about RFID tag 304, for example the time at which RFID tag 304 was within range of camera 306.

Figure 3A:
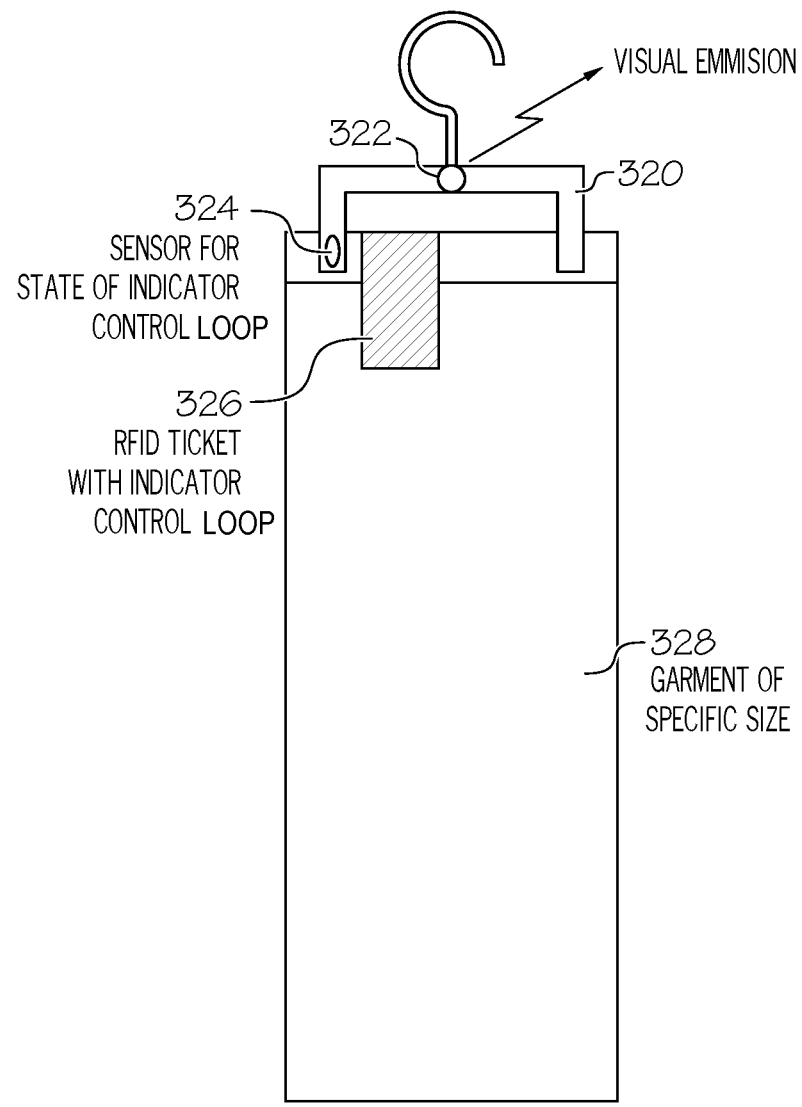
FIG. 3A is a further exemplary embodiment of a system for an indicator drive by an RFID tag.

Reference is now directed to FIG. 3A which shows a further exemplary embodiment of what has been previously discussed in FIG. 3. FIG. 3A shows more detail of the indicator scheme that integrate a re-usable and disposable element 320, such as a hanger that is used to support a garment or other consumer item. Here the hanger 320 is provided with an indicator 322. The hanger 320 has a state sensor 324 positioned so that it will detect the indicator control loop (see FIG. 2A) in a RFID ticket or tag 326 applied to the waist band of some trousers 328.

Figure 4:
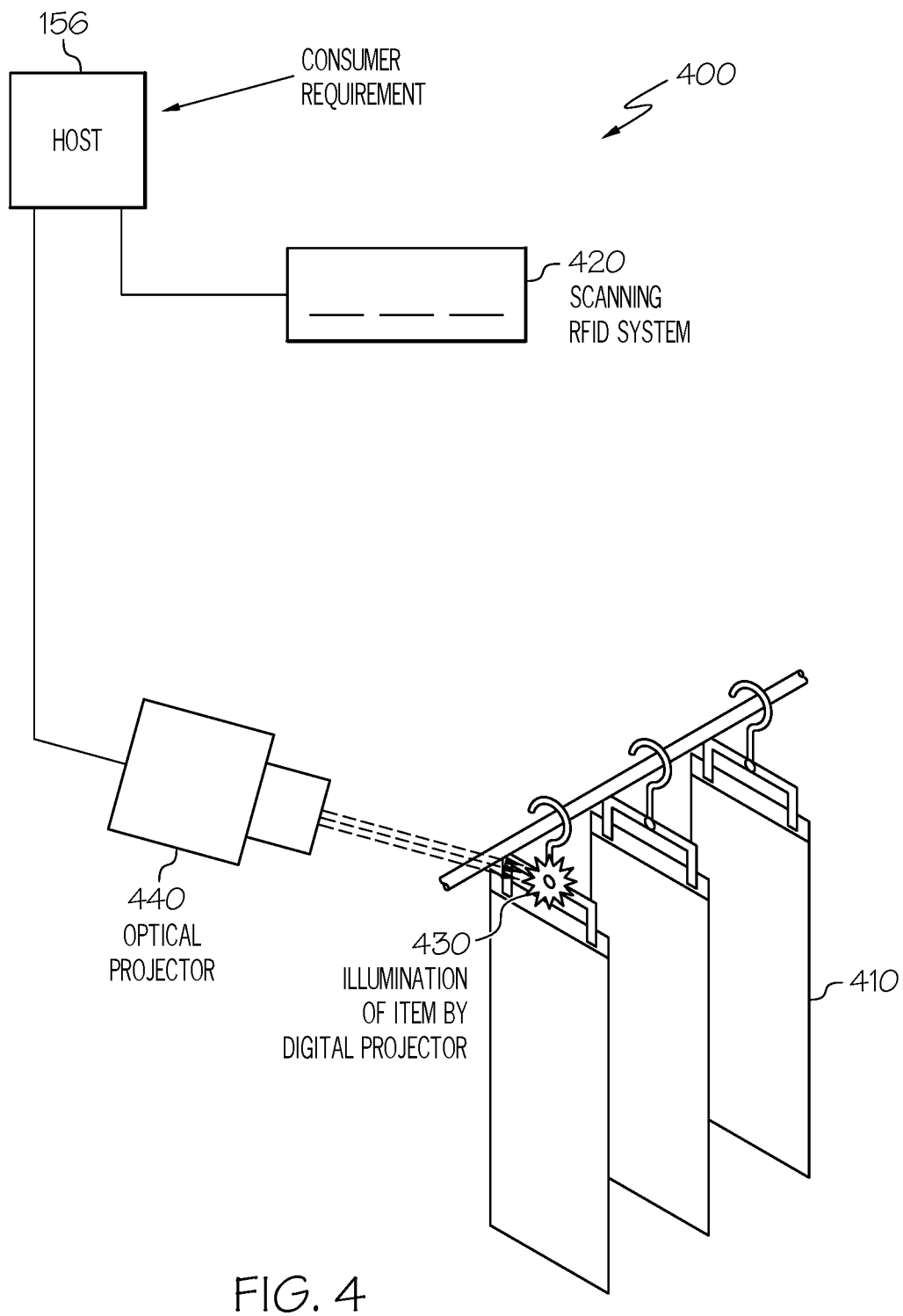
FIG. 4 is an exemplary embodiment of a system using an indicator for localization.
Figure 5:
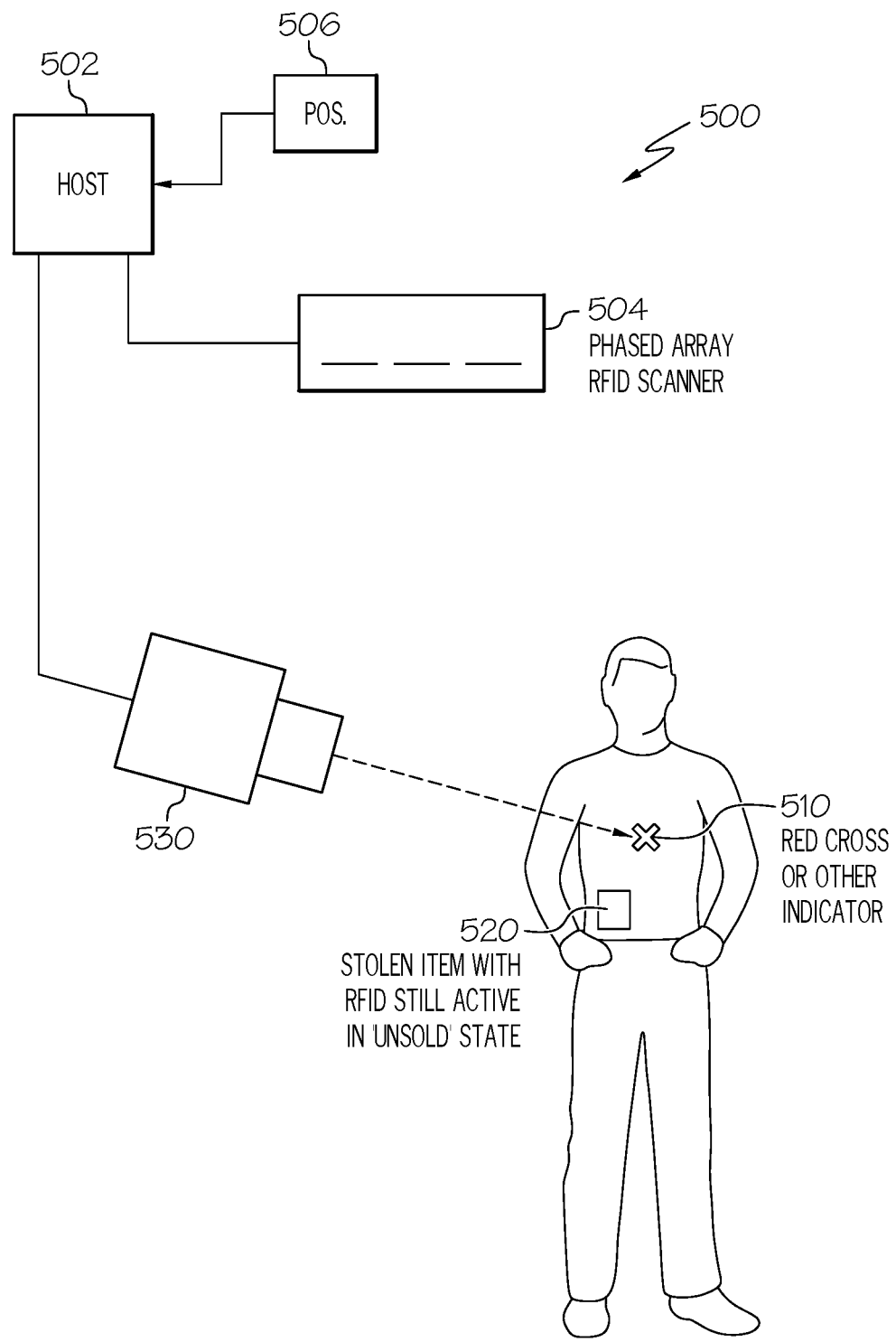
FIG. 5 is an exemplary embodiment of a system using an indicator for a theft deterrent system.

Reference is now directed to FIGS. 4 and 5 which relate to a more general use of the concept that an indicator may be used for localization or information. In this case the indicator is remote, in the form of an image projector or steerable eye safe laser illuminator or some other device that will aid a consumer in locating an item of interest.

FIG. 4 provides an exemplary embodiment of a system using an indicator for localization. FIG. 4 shows a system 400 where the position of a specific garment 410 is determined using a scanning RFID reader system 420, or other RFID localization method such as a shelf reader, e.g. a RFID reader system integral with the shelving or racking unit that supports the consumer items. When a consumer wants to find an item 410, the store system 400 now projects a visual indicator 430 onto the location of the item, via an optical projector 440, to assist the user in finding the item.

Attention is now directed to FIG. 5 which illustrates an exemplary embodiment of a system 500, includes a host RFID system 502 and a phased array RFID scanner 504 which is connected to the point of sale (POS) system 506 of the retail environment. The system 500 using an indicator 510 for a theft deterrent system. In FIG. 5 when a RFID tag 520 that has not been cleared to be removed from the store, that is the tagged item has not been recorded as having been near the point of sale terminal 506, approaches an exit, the system 500, after calculating the location history of the RFID tag 520, via a projector 530 will project an image/laser spot 510 onto the body or floor space in front of them using a projector 530, making it easy for the store staff to see the person, and offer to assist them in the event they have made a mistake, but also acting as a deterrent, as the system 500 has clearly 'seen' the item near a point of sale terminal prior to them exiting.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for an indicator driven by a radio frequency identification (RFID) tag for localization purposes, comprising:
a host system;
a communication system including a mobile device operated by a person to communicate with the host system;
a plurality of similar items, including an item of interest;
a unique RFID tag disposed on each of the plurality of similar items that is specific to each of the plurality of similar items, each RFID tag having an associated indicator element comprising a visual indicator and/or an audio indicator and that is not included directly on the RFID tag but is built into a reusable item;
an indicator detector; and
a reader system comprising
a RFID reader in communication with the host system and each RFID tag, the RFID reader operable to signal each RFID tag to activate the associated indicator element when the RFID tag is receiving energy above a defined threshold,
where each RFID tag is configured to modulate the associated indicator element when the RFID tag communicates to the reader system allowing a system to correlate data streams to provide an image or other representation which associates an RFID identity with the indicator, and
wherein the host system is configured to allow a consumer to specify the item of interest with the mobile device and activate the indicator element by interaction with the communication system and the RFID reader in order to locate the item of interest, and
where the RFID system is integrated with a shelving or racking where the plurality of similar items are located.

2. The system of claim 1, wherein each of the plurality of similar items is any one of a box, package, pallet or product container.

3. The system of claim 1, wherein each of the plurality of similar items is any one of a document, file or folder.

4. The system of claim 1, wherein the RFID reader is in wireless communication with each RFID tag.

5. The system of claim 1, wherein the visual indicator is a light emitting diode, electro-luminescent panel or other emissive visual indicator.

6. A system for an indicator driven by a radio frequency identification (RFID) tag for localization purposes, comprising:
an item among a plurality of items;
a RFID tag unique to each of the plurality of items attached to each of the plurality of items;
a each RFID tag having an associated indicator element; comprising a visual indicator and/or an audio indicator and that is not included directly on the RFID tag but is built into a reusable item
a camera operable to detect the indicator element of each RFID tag and to record a time at which each RFID tag was within range of the camera; and
an electronic shutter on the camera such that the camera only accepts light when the indicator element is emitting.

7. The system of claim 6, wherein the indicator element is an infra-red element, and the camera is equipped with an infra-red filter.

8. The system of claim 6, wherein the item is any one of a security badge, security pass, ticket or sensitive document.

9. A method for an indicator driven by a radio frequency identification (RFID) tag for localization purposes, comprising:

associating a unique RFID tag with an item that is specific to the item, the RFID tag having an indicator element that is a control loop, where the item is any one of a security badge, security pass, ticket or sensitive document, and the RFID tag having a coil connected to a pair of pins on an RFID chip;

transmitting a signal from a RFID reader to the unique RFID tag;

activating the indicator element of the RFID tag upon receiving the signal from the RFID reader;

localizing the item by means of the indicator element; and recording the time at which the RFID tag was within range of a camera, wherein a time between activating the indicator is changed according to a pseudo random pattern.

10. A system for an indicator driven by a radio frequency identification (RFID) tag for localization purposes, comprising:

an item, where the item is any one of a security badge, security pass, ticket or sensitive document;

a unique RFID tag that is specific to the item disposed on the item;

an indicator projector remote from the item; and a RFID reader comprising a phased array scanner in communication with the RFID tag, the RFID reader operable to signal the RFID tag to activate the indicator projector to project a visual indicator onto the item to aid in locating the item and where the system is configured to activate the projector to project an image or laser spot onto the body of or floor space near the item if the RFID tag has not been recorded as having been near a point of sale terminal by calculating the location history of the RFID tag.

11. The system of claim 1, wherein the communication system comprises at least one of internet, WIFI and short range NFC.

12. The system of claim 1, where the indicator element is a non-emissive visual indicator.

13. The system of claim 12, where the non-emissive visual indicator is a liquid crystal device, an electrophoretic device, or a liquid crystal display shutter combined with an optical retroflector.

14. The system of claim 1, where each RFID tag has an indicator control element.

15. The system of claim 14, where the indicator control element is a coil connected to a pair of input/output pins on a RFID chip on the RFID tag.

* * * * *